United States Patent [19]
Seitz et al.

[11] Patent Number: 5,124,846
[45] Date of Patent: Jun. 23, 1992

[54] OUTSIDE REAR-VIEW MIRROR FOR VEHICLES

[75] Inventors: Edwin Seitz, Neuenbuch; Herwig Polzer, Miltenberg, both of Fed. Rep. of Germany

[73] Assignee: Hohe KG, Collenberg, Fed. Rep. of Germany

[21] Appl. No.: 528,884

[22] Filed: May 29, 1990

[30] Foreign Application Priority Data

May 29, 1989 [DE] Fed. Rep. of Germany ....... 8906557
Oct. 26, 1989 [DE] Fed. Rep. of Germany ....... 3935632

[51] Int. Cl.$^5$ ............................................. G02B 5/08
[52] U.S. Cl. ................................. 359/843; 359/841
[58] Field of Search ............. 350/604, 606, 626, 633,
350/634, 637, 280, 632, 604; 248/900, 548, 348

[56] References Cited

U.S. PATENT DOCUMENTS

| 4,506,954 | 3/1985 | Enomoto | 350/634 |
| 4,548,483 | 10/1985 | Moro et al. | 248/900 |
| 4,740,066 | 4/1988 | Whitehead | 350/604 |
| 4,840,475 | 6/1989 | Herzog et al. | 248/900 |
| 4,877,319 | 10/1989 | Mittelhäser | 350/604 |
| 4,969,727 | 11/1990 | Harloff et al. | 248/900 |

FOREIGN PATENT DOCUMENTS

| 0085737 | 8/1983 | European Pat. Off. | 350/634 |
| 0146888 | 12/1984 | European Pat. Off. | |
| 169245 | 1/1985 | European Pat. Off. | |
| 3538159 | 10/1985 | Fed. Rep. of Germany | |
| 60-92132 | 5/1985 | Japan | 350/604 |
| 62-261557 | 11/1987 | Japan | 350/637 |

*Primary Examiner*—Paul M. Dzierzynski
*Assistant Examiner*—Hung Xuan Dang
*Attorney, Agent, or Firm*—Fleit, Jacobson, Cohn, Price, Holman & Stern

[57] ABSTRACT

Disclosed is an outside rear-view for a vehicle which has a pedestal to be mounted to a body of the vehicle and a mirror housing held to the pedestal. An electric motor is provided for tilting the mirror housing relative to the pedestal. The electric motor is mounted to the inner surface of an assembly plate bordering the pedestal towards the body, and the drive shaft of the electric motor is linked preferably through a transmission gear and/or a clutch and through a cam to a rigid transmission member coupled to the mirror housing. Alternatively, the drive motor may be mounted within the interior of the mirror housing, the transmission member coupled to the cam of the driving motor then may be coupled to the pedestal. Thereby the advantages are obtained that the electric driving motor does not project outwardly from the normal outer conture of an outside rear-view mirror and may be utilized for any modes of mounting of the mirror housing to the pedestal.

9 Claims, 7 Drawing Sheets

OUTSIDE REAR-VIEW MIRROR FOR VEHICLES

BACKGROUND OF THE INVENTION

1. Field of the Invention

The invention refers to an outside rear-view mirror for vehicles. The mirror comprises a pedestal adapted to be mounted to the body of the vehicle, and a mirror housing which is coupled to the pedestal and which may tilt relative to the pedestal by activating an electric motor.

2. Description of Related Art

German Patent Specification 35 38 159 discloses an outside rear-view mirror for a commercial vehicle the mirror housing of which is held at a pedestal mounted to the body of the vehicle. An electric motor is mounted to the pedestal and may be activated electrically by the driver of the vehicle. The motor is coupled to the mirror housing by a clutch and upon activation swings the mirror housing towards the body of the vehicle or swings the tilted mirror housing to the position of normal use thereof.

The electric motor is mounted outwardly to the pedestal and therefore has to be packaged carefully for eliminating influences of dust and humidity. Such hermetic packaging of the electric motor is a drawback of the known device particularly in view of the considerable extend of a housing into which the electric motor has to be embeded. Moreover, for fast running cars the separate electric motor housing may give cause to windnoise.

Therefore, a number of attempts have been made to integrate invisibly the drive motor into the outside rear-view mirror. As an example, published European Patent Application 146 888 discloses a drive motor which is mounted within the mirror housing close to the tilting axes thereof and which is coupled to the pedestal through a gear transmission. An arm projects laterally from the pedestal below a portion of the mirror housing close to the pedestal and which is connected to said portion by a bolt or rivet to which a gear is mounted. This structure, however, cannot be utilized for outside rear-view mirrors the mirror housing of which is coupled to the pedestal by two spaced roller barings or by a rocker. Moreover, mounting of the drive motor within the mirror housing occupies space which would be needed for bowden-cables or similar transmission means for mechanically adjusting a mirror glass held within the mirror housing.

SUMMARY OF THE INVENTION

It is therefore an object of the invention to provide an improved outside rear-view mirror the mirror housing of which may be tilted relative to a pedestal by an electric motor. It is also an object underlying the invention to mount the drive motor for the mirror housing such that it does not project beyond the normal outer periphery of the outside rear-view mirror. Moreover, the drive motor is to be mounted within the outside rear-view mirror such that it may be utilized for any type of coupling of the mirror housing to the pedestal.

According to the invention the drive motor is mounted to a plate bordering the pedestal to the vehicle body, and the driving shaft of the drive motor is non-rotatably connected to a cam, for instance through a gear and/or a clutch, and a rigid transmission member is coupled to the mirror housing and is hung into the cam. Alternatively, the drive motor may be mounted within the interior of the mirror housing, and the transmission member hung into the cam of the drive motor is coupled to the pedestal. The invention allows an integration of the drive motor into the unmodified common outer periphery of the outside rear-view mirror and may be utilized for all types of mounting of the mirror housing to the pedestal.

According to an improvement of the invention the drive motor is mounted to the inner surface of an assembly plate of the pedestal so that the drive motor may extend through an opening of the outer shell of the car body into a space which is not utilized otherwise. Thereby, the advantage is obtained that the mounting space for the drive motor is minimized.

According to another improvement of the invention the mirror housing is held to the pedestal in position of normal use by one or a plurality of strong tension springs. The transmission member is coupled at one free end thereof to a turning lever linked to the pedestal, and an eyelet is formed between the link of the transmission member and a link of the turning lever. Thereby the driving torque which has to be exerted by the drive motor is reduced.

According to yet another improvement of the invention a leading edge may be formed from the turning lever against which a member fixed to the mirror housing may abut, for instance a bolt projecting from a support plate for the mirror glass. Thereby the driving torque to be developed by the electric driving motor is reduced.

According to yet another improvement of the invention the mirror housing is coupled to the pedestal by a second tension spring which extends substantially parallel to the first tension spring. The second tension spring is hung to a shackle mounted to the pedestal along which the end of the tension spring which is proximate to the pedestal may slide during the tilting of the mirror housing. Thereby, the necessary driving torque is even more reduced.

According to yet another embodiment of the invention a hook may be formed from the turning lever against which a member fixed to the mirror housing, for instance a pin projecting from a support plate, may run for defining a tilted end position of the mirror housing.

BRIEF DESCRIPTION OF THE DRAWINGS

Presently preferred embodiments of the invention are disclosed in the attached drawings which are explained herein after in detail. From the drawings show FIG. 1 a schematic perspective view of a portion of an outside rear-view mirror having a pedestal and a mirror housing in normal use position.

DESCRIPTION OF THE PREFERRED EMBODIMENTS

Figure 1:
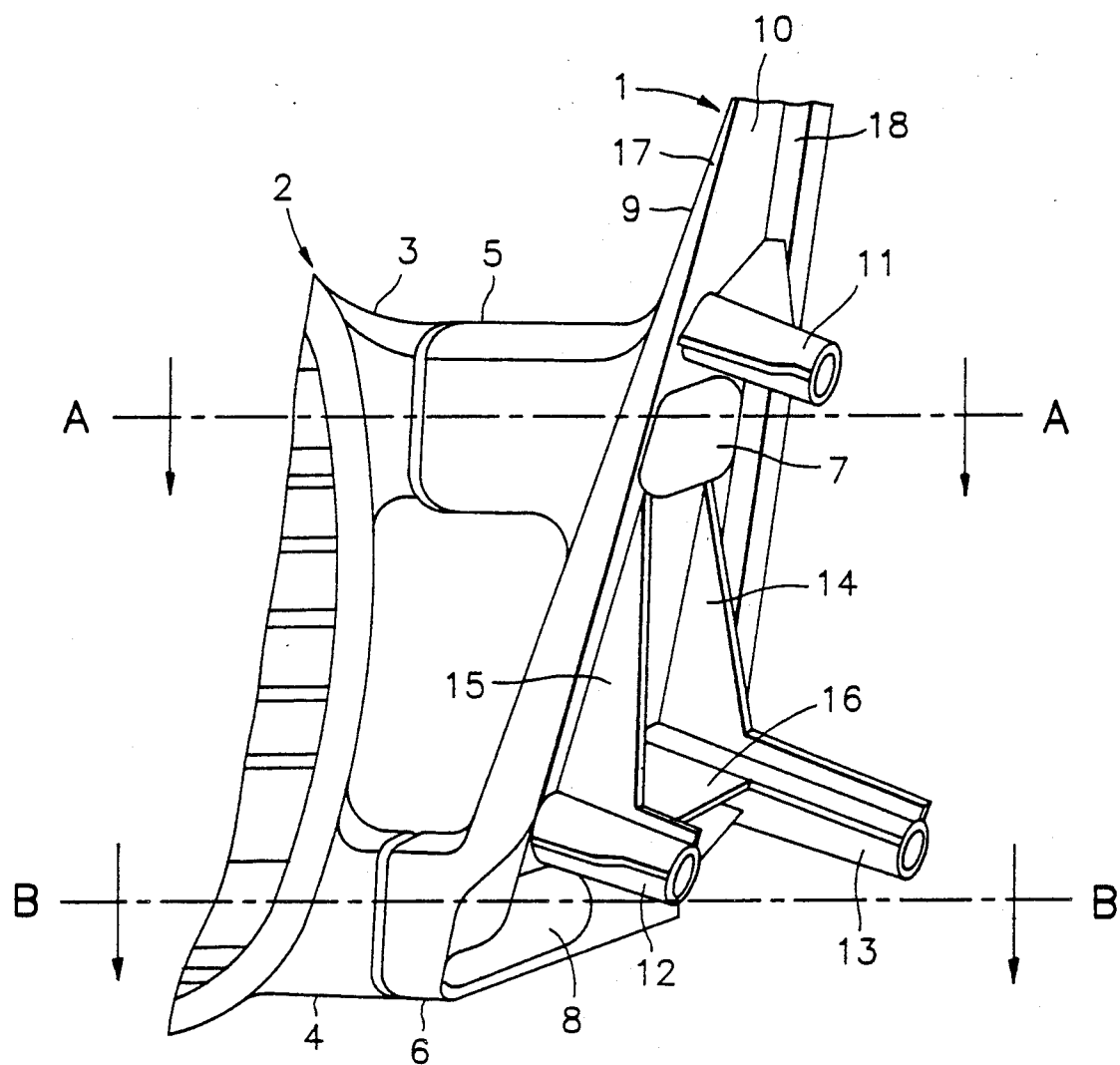

Herein after the invention is explained for an outside rear-view mirror the outer conture of which corresponds to an outside rear-view mirror as disclosed in West-German Utility Model specification G 88 02 473. Thus, the outside rear-view mirror includes a pedestal 1 and a mirror housing 2. An upper extension 3 and a lower extension 4 of the mirror housing abut an upper foot portion 5 and a lower foot portion 6 of the pedestal. The extensions 3, 4 and the foot portions 5, 6 are hollow and have a substantially reticular cross section when seen according to FIG. 2 so that mechanic or electric manipulation transmission means not shown for a mirror glass not shown mounted within the mirror housing may extend through one or both of extensions 3, 4 and foot portions 5, 6 and through corresponding openings 7, 8 in the pedestal 1.

The pedestal 1 includes an assembly plate 9 from which the upper foot portion 5 and the lower foot portion 6 project outwardly. Three mounting posts 11, 12, 13 project from the inner surface of assembly plate 9 by which the outside rear-view mirror may be mounted to a car body not shown, e.g. to the front tryangle of the window of the driver's door or of the door shelt of a driver's door. The upper mounting post 11 is formed above the upper opening 7 and the two lower mounting posts 12, 13 are formed below the lower opening 8. Thus, a mounting space is formed which extends between the lower edge of the upper opening 7 and both lower mounting posts 12, 13 and two opposite lateral walls 14, 15 and a bottom wall 16. An electric driving motor 20 may be mounted within the mounting space. The tryangular lateral walls 14, 15 are connected to the inner surface 10 and to one of both mounting posts 12, 13. The bottom plate 16 extends between the mounting posts 12, 13. The assembly plate 9 has inwardly bent rims 17, 18 which abut the car body preferably through elastic sealing strips not shown when the outside rear-view mirror is mounted to a car. The body sheet has outcuts for penetration of the mounting posts 11, 12, 13 and for enlarging the mounting space so that the driving motor may be held on the assembly plate and may extend at least partially through the body sheet into the door panel.

Figure 2:
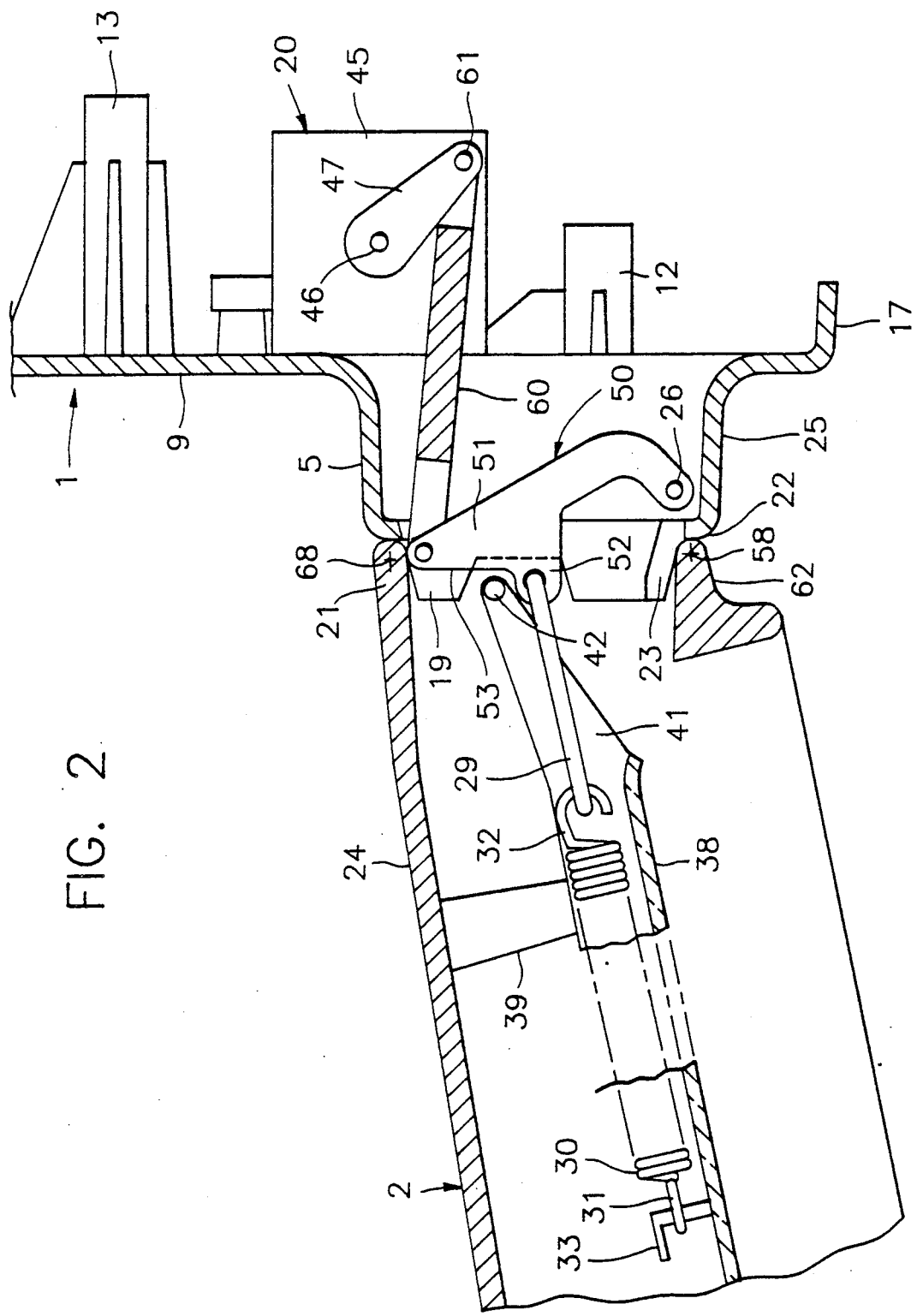
FIG. 2 a section through the outside rear-view mirror along line A—A of FIG. 1.
Figure 3:
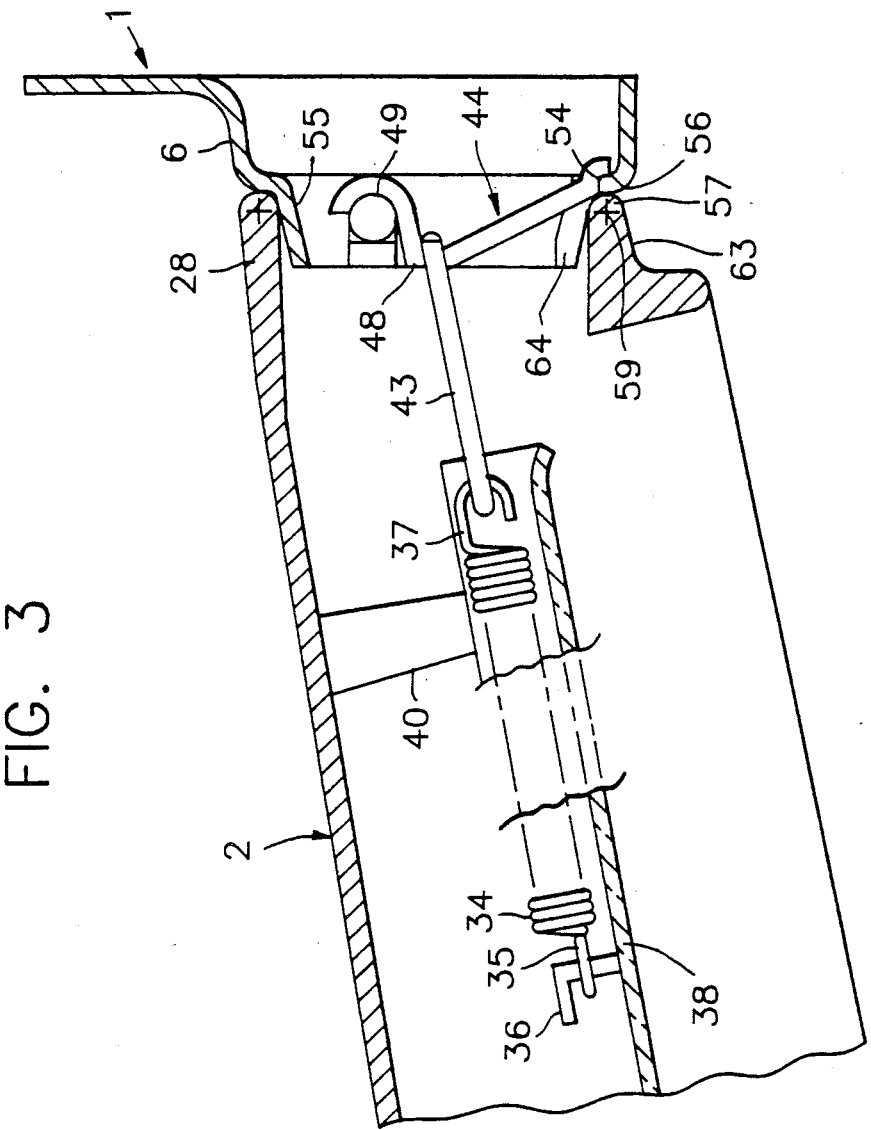
FIG. 3 a section through the outside rear-view mirror along line B—B in FIG. 1.
Figure 4:
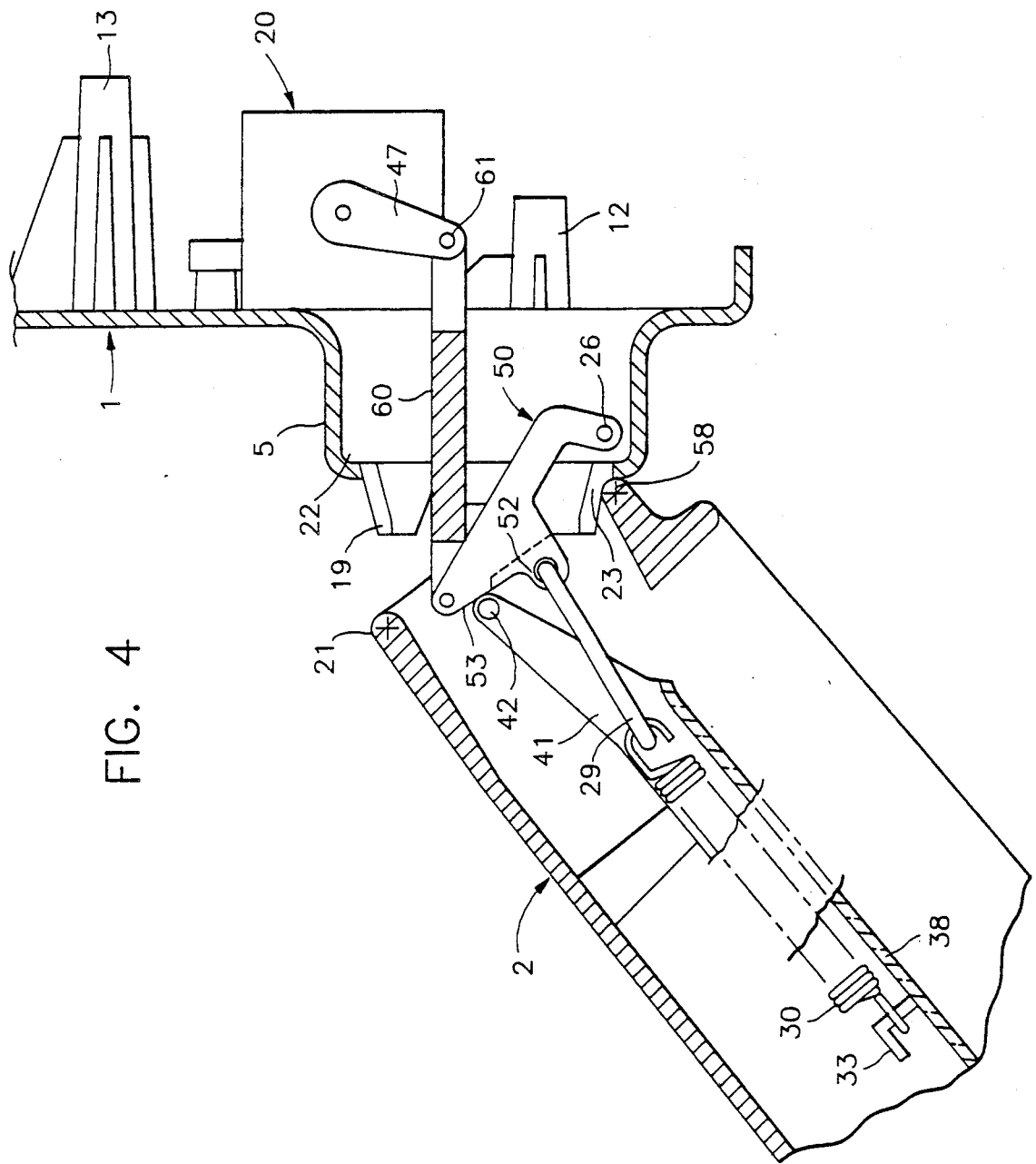
FIG. 4 a representation similar to FIG. 2 wherein the mirror housing is tilted rearwardly over a portion of the tilting range.
Figure 5:
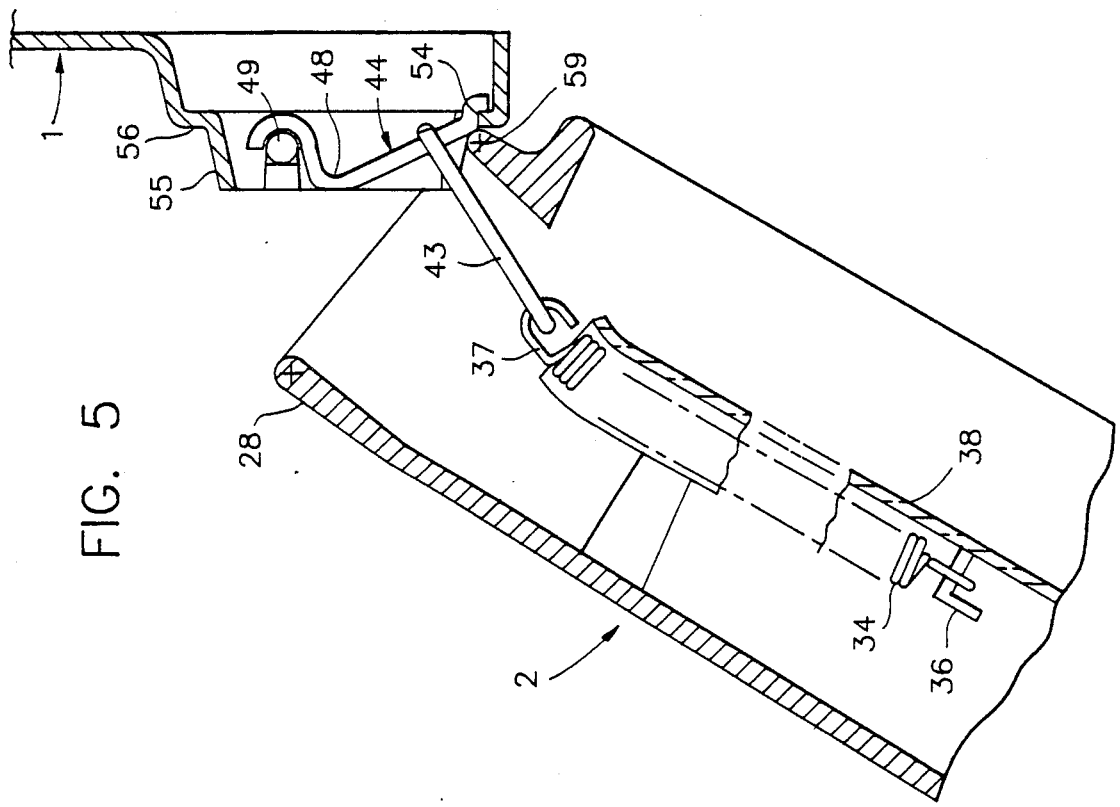
FIG. 5 a representation similar to FIG. 3 wherein the mirror housing is tilted rearwardly.

According to FIG. 2 the upper foot portion 5 has a surrounding inwardly off-set neck 19 so that the ball like rim 21 of the upper extension 3 may rest on a ring shoulder 22 surrounding neck 19 when the mirror housing 2 assumes the position of normal use. An outcut 23 is provided within the rearward portion of neck 19 which will be explained herein after.

The mirror housing 2 is held in position of normal use by two strong parallel tension springs, i.e. the upper tension spring 30 and the lower tension spring 34. The end 31 off the pedestal of the upper extension spring is hung into a nippel 33 of a stiff support plate 38 which is screwed or riveted on posts 39, 40 projecting from the inner bottom 24 of the mirror housing. The upper tension spring 30 extends between bottom 24 of the mirror housing and the rearward surface of support plate 38 on the level of the upper extension 3. The end 32 proximate to the pedestal of tension spring 30 is hung into a rigid intermediate member 29 which is anchored within an eyelet 52 of a turning lever 50 proximate to the neck 19. The support plate 38 supports upon its front surface opposite to the tension spring 30 a mirror glass not shown and an adjustment means therefor not shown.

The turning lever 50 is pivotly mounted to a pin 26 proximate to a rear wall 25 (with respect to the driving direction of the car) of the upper foot portion 5 in the interior thereof in such a manner that turning a lever 50 extends substantially horizontally when the outside rear-view mirror is assembled and mounted to the car and may turn or pivot within a horizontal plane about pin 26.

The end 51 of turning lever 50 opposite to the pin 26 is pivotally connected to the free end of a rodlike transmission member 60 and lies within neck 19 when the mirror housing 12 assumes its position of normal use as shown in FIG. 2. The connection of end 51 to turning lever 50 then is substantially within a plane including the forward tilting axes 68 and the rearward tilting axes 58 of the mirror housing. The eyelet 52 is formed from a middle portion of turning lever 50 between end 51 and pin 26 and projects towards the interior of the mirror housing. It may be seen that the line along which tension spring 30 develops force extends horizontally through the upper extension 3 and the upper foot portion 5.

An arm 41 is formed from support plate 38 and projects towards turning level 50 and terminates shortly and below a free edge 53 of turning lever between eyelet 52 and end 51. A bolt 42 extends from the end of arm 41 proximate to edge 53 upwardly and above edge 53.

Figure 6:
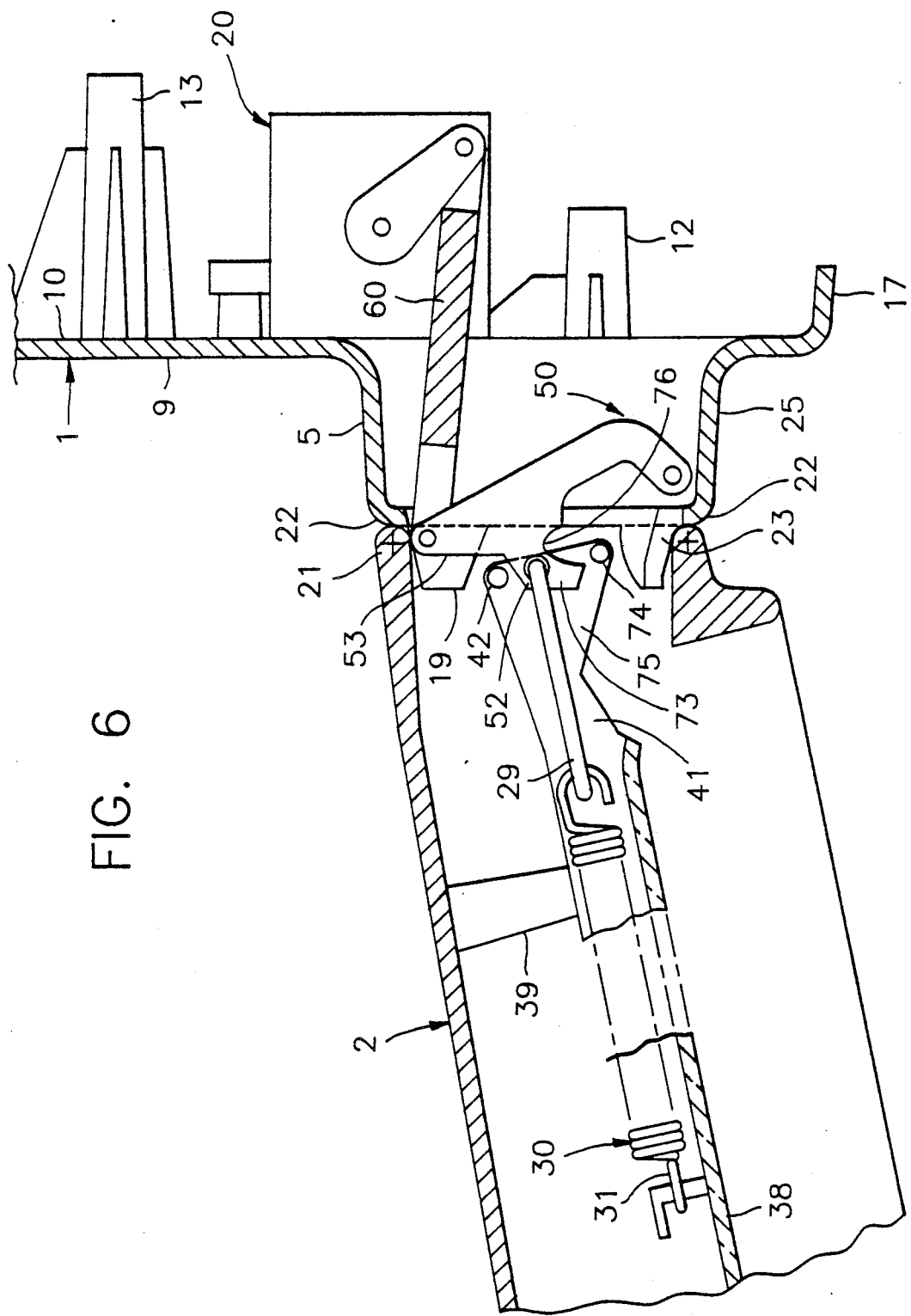
FIG. 6 a representation similar to FIG. 2 of a second embodiment.
Figure 7:
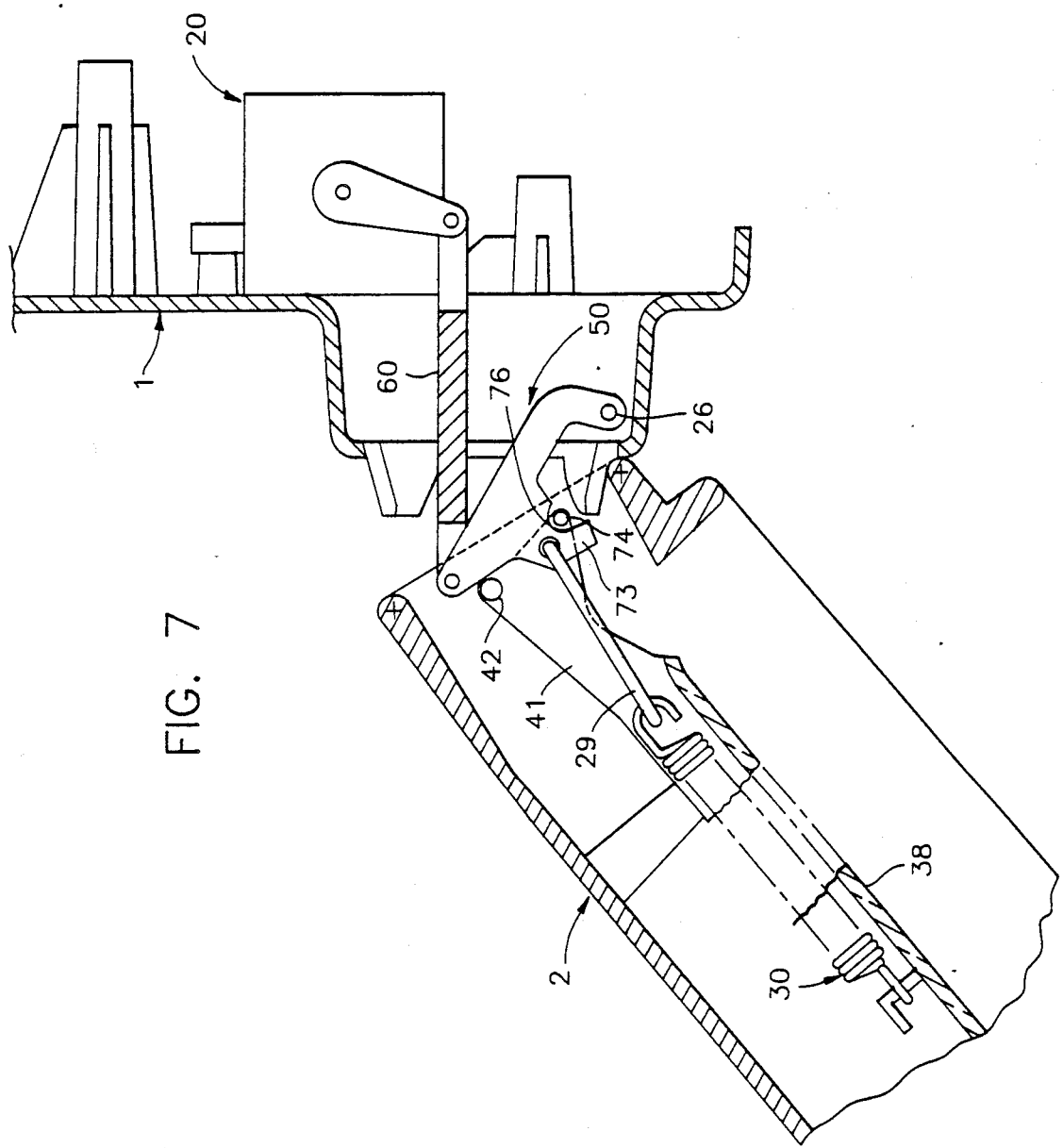
FIG. 7 a representation similar to FIG. 4 of the second embodiment.

According to the embodiment of the outside rear-view mirror as shown in FIGS. 6 and 7 the eyelet 52 is extended to a hook 73 behind wich a second bolt 74 may abut. The second bolt 74 is mounted to a rearward extension 75 of arm 41 at a position that hook 73 extends between bolts 42 and 74 when the mirror housing assumes the position of normal use. When the mirror housing 2 tilts rearwardly from the position of normal use (FIG. 6) the bolt 74 may run into a groove 76 of turning lever 50 behind hook 73. When bolt 74 is caught within groove 76 the mirror housing assumes a rearward tilting end position, FIG. 7.

The drive motor 20 is hermatically sealed within a housing 45 within which additionally a reduction gear and a clutch may be provided. The clutch may operatively separate the driving shaft of the driving motor 20 from the transmission member 60 if the mirror housing 2 undergoes an impact which is stronger than a predetermine threshold value. Such a clutch is disclosed i.e. in the published European Patent Application 169 245. For the purpose of the present invention providing such a clutch, however, is not necessary. A shaft 46 extending from housing 45 is unrotatably connected to a cam 47 the free end of which is linked to a free end of transmission member 60 opposite to the end 51. An imaginary line through the center of shaft 46 to the link 61 of cam 47 to transmission member 60 runs away from the mirror housing in the position of normal use thereof according to FIG. 2. Thus, the transmission member 60 extends through the interior of the upper foot portion 5, and the driving motor 20 with housing 45 is mounted within the mounting space such that the transmission member 60 may extend substantially horizontally when the outside rear-view mirror is mounted to a car.

The end opposite to the pedestal of lower tension spring 34 is hung into a lower nippel 36 formed from support plate 38, and the end 37 proximate to the pedestal of lower tension spring 34 is linked to a lower intermediate member 43. The end proximate to the pedestal of lower intermediate member 43 engages a bent spring steel shackle 44 and rests within a corner 48 of shackle 44 when the mirror housing 2 assumes the position of normal use. The ends of shackle 44 are anchored on a pin 49, and on a projection 54, respectively, which are formed within the interior of neck 55 of lower foot portion 6. Said neck 55 has a rearward outcut 56 and is offset inwardly for forming a surrounding ring shoulder 56 upon which the ball like end 57 of lower extension 4 may abut. It may be seen that the line of the force devellopped by the lower extension spring 34 extends through the lower extension 4 and the neck of the lower foot portion 6.

The rearward positive tilting of mirror housing 2 towards the car body may be effected as follows:

When the drive motor 20 is electrically connected by not shown electric lines through a switch provided on the panel of the car to the battery of the car and the driver activates the drive motor by operating the switch the shaft 46 will rotate in clockwise direction according to the representation of FIG. 2 to the effect, that the cam 47 shifts the transmission member 60 to the left according to FIG. 2. Such movement is transferred into a leftwise pivoting movement of turning lever about pin 26. The eyelet 52 of turning lever 50 moves also to the left so that the upper tension spring 30 will advancingly reduce its tension force until the leading edge 53 of turning lever 50 abuts bolt 42. The continuing rotation of shaft 46 causes the turning lever 50 to tilt the support plate 38 and the mirror housing connected thereto rearwardly with respect to the driving direction of the car out of the position of normal use, whereby the mirror housing 2 tilts about the rearward rims of the upper extension and lower extension 4. The rearward tilting axis of the mirror housing is offset rearwardly with respect to pin 26 and extends through the centers 58, 59 of the ball like contures of the straight rearward sections 62, 63 of rims 21 and 28 of the upper extension 3 and the lower extension 4, respectively. During such tilting the drive motor has to surmount the tension force only of the lower tension spring 34 because eyelet 52 shares the tilting movement of turning lever 50. During the tilting movement the end proximate to the pedestal of the lower intermediate member 43 slides rearwardly along shackle 44. Thereby the working point of the lower tension spring 34 is shifted rearwardly so that the counter torque developed by the lower tension spring is minimized. The rearward tilting movement of the mirror housing 2 continues with further rotation of shaft 46 until the operating line of the tension force of the upper tension spring 30 passes the axes of pin 26. Thereby the turning lever may dip into the outcut 23 and the intermediate member 43 may dip into the outcut 64 of neck 55. Thereafter the torque developed by the upper tension spring results to a further tilting of the mirror housing 2 towards the car body to the effect that the torque to be developed by driving motor 20 is minimized. The tilting movement terminates in the embodiment according to FIGS. 2 through 5 when the imaginary line through both links of the transmission member 60 run through the center of shaft 46. In the embodiment according to FIGS. 6 and 7 the tilting movement terminates when pin 74 is caught within groove 76. Not shown means may be provided for deactivating the drive motor 20 at the end of the tilting movement. In case the drive motor 20 is activated to an inverse rotation the inverse rotation of shaft 46 results in a back tilting of mirror housing 2 into the position of normal use wherein the above explained phases of the tilting movement are passed in inverse order.

In case the mirror housing 2 being in a position of normal use undergoes an impact directed rearwardly or forwardly the mirror housing may yield rearwardly or forwardly (about the tilting axes) when the drive motor 20 is not activated. The turning lever 50, however, remains in the position as shown in FIG. 2 and the upper tension spring 30 and the lower tension spring 34 develop returning forces in usual manner so that the mirror housing may return to the position of normal use when the impact ceases.

It is within the scope of the invention to utilize tension springs 30, 34 the ends thereof proximate to the pedestal are supported by a portion of the mirror housing and the ends thereof opposite to the pedestal are coupled to transmission members or the like which extend through the tension springs and are coupled to the eyelet 52 and the shackle 44, respectively.

What is claimed is:

1. An outside mirror for a vehicle, said outside mirror comprising
   a pedestal for mounting to a body of the vehicle,
   a mirror housing mounted on the pedestal,
   a turning lever pivotably mounted at one end on said pedestal,
   a tension spring mounted within said mirror housing, one end of said tension spring being secured within said mirror housing, the other end of said spring being interconnected to an eyelet located at an intermediate portion of said turning lever,
   an electric motor for tilting the mirror housing with respect to the pedestal, the electric motor being mounted on a plate forming part of the pedestal,
   a driving shaft of the electric motor fixedly connected to a cam,
   a rigid transmission member coupled to the turning lever and to the cam for transferring movement of the driving shaft to tilt the mirror housing with respect to the pedestal,
   said rigid transmission member being pivotably connected to an opposite end of said turning lever, and
   a leading edge of said turning lever during movement by said rigid transmission member being formed between said eyelet and the connection of said transmission member to said turning lever.

2. The outside rear-view mirror according to claim 1, wherein the electric motor is mounted to an inner surface of the plate of the pedestal.

3. The outside rear-view mirror according to claim 1, wherein the leading edge is is engaged by an elongated arm of a support plate fixedly mounted to the mirror housing. member is linked to a turning lever.

4. The outside rear-view mirror according to claim 1, wherein at least one foot portion extends from the pedestal towards the mirror housing, the foot portion having an inwardly offset neck for supporting a rim of the mirror housing by a ring shoulder surrounding the neck.

5. The outside rear-view mirror according to claim 1, wherein another tension spring is mounted within the mirror housing and extending parallel to said tension spring, one of the two parallel extending tension springs being coupled to the eyelet and the other of the two parallel extending tension springs being coupled to a shackle mounted to the pedestal.

6. The outside rear-view mirror according to claim 1, wherein a hook is formed at the pedestal for allowing a groove to catch a pin formed from the mirror housing.

7. The outside rear-view mirror according to claim 6, wherein the hook is formed as an extension of an eyelet and the pin is mounted to said arm of a support plate fixed to the mirror housing such that the hook extends between an abutment and a pin when the mirror housing assumes a position of normal use.

8. An outside mirror for a vehicle, said outside mirror comprising
   a pedestal for mounting to a body of the vehicle,
   a mirror housing method on the pedestal,
   a turning lever pivotably mounted at one end on said pedestal,
   two parallel extending tension springs mounted within said mirror housing, one of said two parallel tension springs being coupled to an eyelet located at an intermediate portion of said turning lever and the other of said two parallel extending tension springs being coupled to a shackle mounted to the pedestal,
   an electric motor for tilting the mirror housing with respect to the pedestal, the electric motor being mounted on a plate forming part of the pedestal,
   a driving shaft of the electric motor fixedly connected to a cam,
   a rigid transmission member coupled to the mirror housing and to the cam for transferring movement of the driving shaft to tilt the mirror housing with respect to the pedestal,
   said rigid transmission member being pivotably connected to an opposite end of said turning lever, and
   two foot portions projecting from said pedestal and said eyelet extending into one of said two foot portions and said shackle extending into the other of said two foot portions.

9. An outside mirror as claimed in claim 8, wherein an end of said other of said two parallel springs slides along said shackle during movement of said mirror housing.

* * * * *